(12) United States Patent
Scholz

(10) Patent No.: US 8,918,919 B2
(45) Date of Patent: Dec. 30, 2014

(54) INFRARED-REFLECTING COVERING MATERIAL

(75) Inventor: Hermann Scholz, Ottobrunn (DE)

(73) Assignee: W. L. Gore & Associates, Inc., Newark, DE (US)

( * ) Notice: Subject to any disclaimer, the term of this patent is extended or adjusted under 35 U.S.C. 154(b) by 989 days.

(21) Appl. No.: 10/525,588

(22) PCT Filed: Aug. 28, 2003

(86) PCT No.: PCT/DE03/02870
§ 371 (c)(1),
(2), (4) Date: Oct. 7, 2005

(87) PCT Pub. No.: WO2004/020931
PCT Pub. Date: Mar. 11, 2004

(65) Prior Publication Data
US 2006/0099431 A1    May 11, 2006

(30) Foreign Application Priority Data
Aug. 30, 2002  (DE) .................................. 102 40 802

(51) Int. Cl.
| A62B 17/00 | (2006.01) |
| A62D 5/00 | (2006.01) |
| G02B 5/08 | (2006.01) |
| A41D 31/00 | (2006.01) |
| F41H 3/02 | (2006.01) |

(52) U.S. Cl.
CPC ............ *G02B 5/085* (2013.01); *A41D 31/0016* (2013.01); *F41H 3/02* (2013.01)
USPC ............................................................ 2/458

(58) Field of Classification Search
USPC ................... 2/69, 81, 82, 900, 904, 456–458; 66/202; 428/919, 304.4; 442/131–133, 442/378, 379, 317, 234, 238
See application file for complete search history.

(56) References Cited

U.S. PATENT DOCUMENTS

| 3,349,396 A | 10/1967 | Reed ............................... 343/18 |
| 3,953,566 A | 4/1976 | Gore |
| 4,187,390 A | 2/1980 | Gore |
| 4,194,041 A | 3/1980 | Gore et al. |
| 4,230,838 A | 10/1980 | Foy et al. |
| 4,465,731 A | 8/1984 | Pusch et al. .................... 428/247 |
| 4,467,005 A * | 8/1984 | Pusch et al. .................... 428/111 |
| 4,493,870 A | 1/1985 | Vrouenraets et al. |
| 4,532,316 A | 7/1985 | Henn |
| 4,725,481 A | 2/1988 | Ostapachenko |
| 5,750,242 A | 5/1998 | Culler .......................... 428/209 |

(Continued)

FOREIGN PATENT DOCUMENTS

| DE | 20012275 | 1/2001 |
| EP | 1 096 604 A1 | 10/2000 |
| EP | 1 136 785 A2 | 2/2001 |
| WO | WO 00/55566 | 9/2000 |

*Primary Examiner* — Amber Anderson
(74) *Attorney, Agent, or Firm* — Amy L. Miller

(57) ABSTRACT

An invention describes a drapable IR-reflecting material for garments. The IR-reflecting material comprises a water-vapor-permeable metallized ply supporting an air-permeable drapable convective ply having a three-dimensionally transmissive structure. The outer surface of the convective ply, said outer surface being opposite to the metallized ply, is formed by an air-permeable sheetlike structure. The convective ply causes heat convection of temperatures reflected by the metallized ply in order that the outer surface of the convective ply may be brought into line with the ambient temperature.

17 Claims, 9 Drawing Sheets

(56) References Cited

U.S. PATENT DOCUMENTS 5,950,237 A    9/1999  Micheron et al. .................. 2/69
5,955,175 A    9/1999  Culler ........................... 428/209
6,007,898 A *  12/1999 Kim et al. ...................... 428/175

* cited by examiner

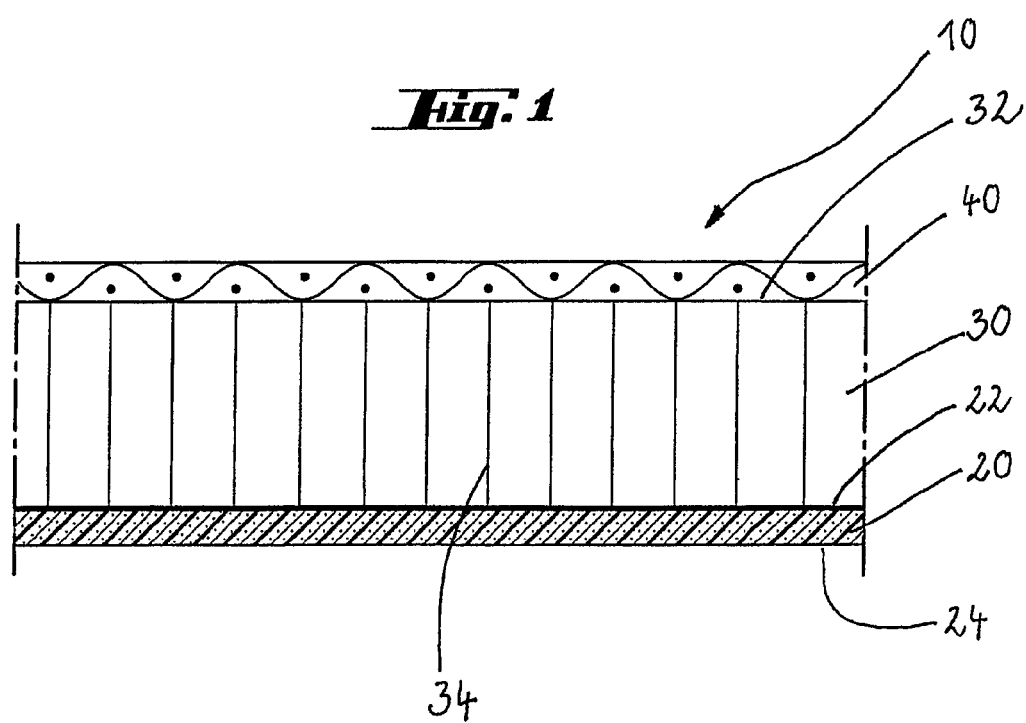

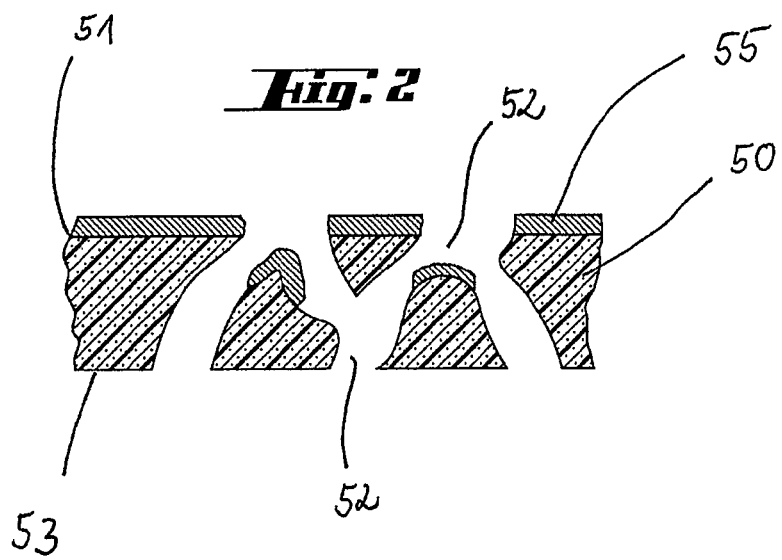
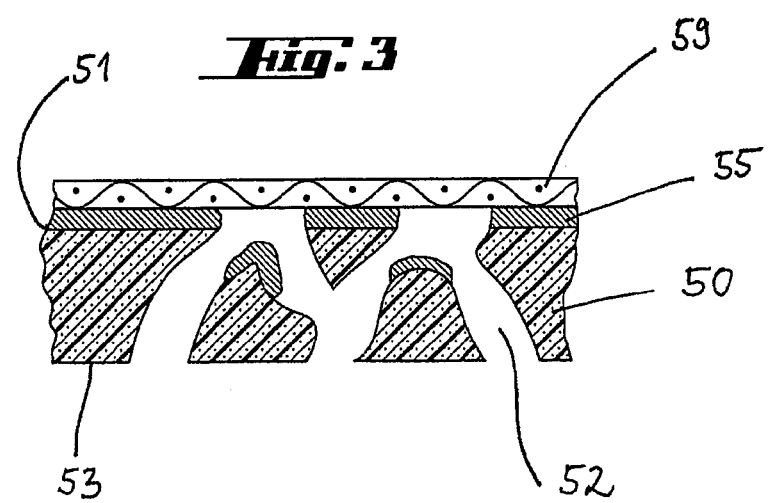
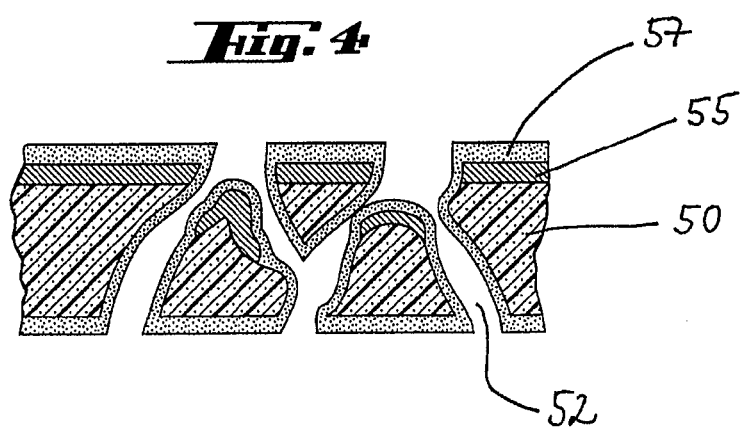

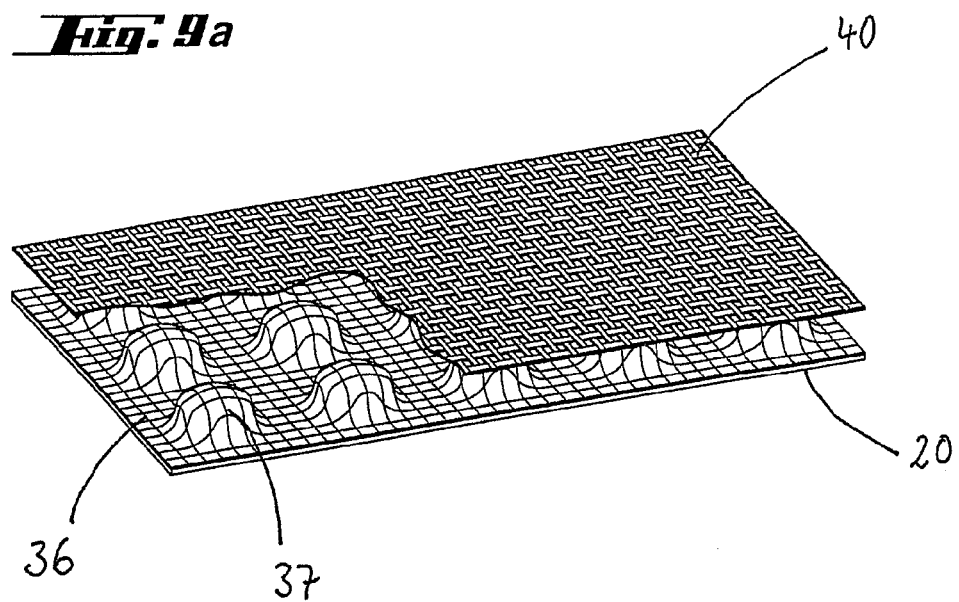
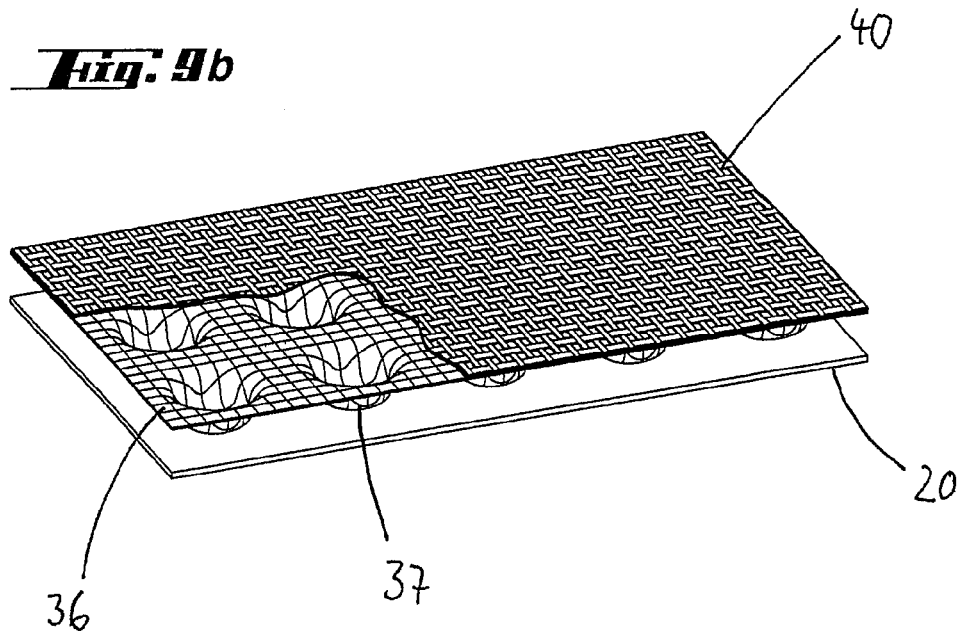

INFRARED-REFLECTING COVERING MATERIAL

This invention relates to electromagnetically reflecting and transmitting materials for camouflage against thermal images and to the use of these materials in watertight, windstopping but water-vapor-permeable garments.

Instruments which detect thermal radiation are well known. Radiation from the human body or other objects can easily be detected by infrared (IR) detecting instruments. These instruments operate in the atmospheric transparency windows of 3-5 µm and 8-12 µm. IR imaging at wavelengths outside these windows is not practical due to atmospheric absorption. In images obtained with these devices, objects with high emissivities and/or objects having a higher temperature relative to the background appear as bright silhouettes. This is due to the emitted power of these objects. The emitted power is described by the equation:

$$W = \epsilon \sigma T^4$$

where W is emitted power in $W/m^2$, $\epsilon$ is emissivity, $\sigma$ is the Stefan-Boltzmann constant and T is the temperature in kelvin.

From this equation it can be seen that there are two possible approaches to subdue a thermal image: use low-emissivity materials on the exterior surface or reduce the exterior surface temperature. The typical approach is to use low-emissivity materials on the exterior surface and then cover the low-emissivity surface with materials which are transparent at IR wavelengths but optically opaque to provide visual camouflage. The second approach is to use thermal insulation to reduce the exterior surface temperature. A third approach is a combination of these methods.

It has long been a desirable goal to develop materials that protect persons or equipment from detection by electromagnetic, and especially infrared, detecting equipment without detracting from the mobility of the personnel or equipment.

It is desirable from a physiological standpoint to reduce the heat stress of the person wearing infrared camouflage garments to the largest extent possible. This can be accomplished by increasing the evaporative cooling of the body by allowing moisture vapor to easily permeate through the IR-camouflaging garment and by reducing weight and thickness of the total thermal camouflage package.

EP 1 096 604 A1 describes a breathable construction for protection against electromagnetic high-frequency fields. This is achieved inter alia through polyamide fibers or yarns coated with a layer of silver. A camouflaging print is applied directly atop the layer of silver. Finally, a polydimethylsiloxane-polyacrylate layer is applied on the outside. The later inner surface of a protective garment produced from this material has applied to it a breathable, water-repellent and windstopping membrane as of polyester, polyurethane or PTFE membrane for example. In one embodiment, a polyester membrane is vapor deposition coated with aluminum. The many layers of this construction, however, cause a deterioration in water vapor permeability. Especially a metallized polyester membrane will not have any significant breathability owing to its metal-coated monolithic structure.

EP 1 136 785 A2 describes a camouflage shelter comprising a collapsible, self-supporting substructure. The camouflage shelter comprises a collapsible, self-supporting network of bars. The outer apices of this network have a camouflage net according to EP 1 096 604 A1 for example placed on them. The inner support points of this network may additionally be provided with a tent tarpaulin or a corresponding layer capable of protecting against precipitation and other effects of the weather. Materials useful as tenting or protective layer include a material according to EP 1 096 604 A1. This geometric arrangement ensures that there is always a distance between the camouflage net and the object to be camouflaged. This gap provides for convective heat transfer between the outer surface and the inner surface, which convective heat transfer is useful for camouflaging against thermal images. The camouflage shelter described in the cited patent is acceptable for purposes where there is no need for substantial flexibility and mobility, for example as covering for stationary objects. However, this camouflage shelter has many disadvantages when it is to be used to protect an individual person against a thermal image without restricting that person's mobility. The most important of these disadvantages are the absent drape, a low water vapor permeability and the weight.

U.S. Pat. No. 5,750,242 describes an IR-reflecting material comprising a microporous metallized membrane that is air permeable, water vapor permeable and water resistant, the metal forming a discontinuous layer on the surface and on the pore walls adjacent the surface of the microporous membrane, so that looking vertically down from the top of the surface of the membrane the metal appears to be continuous.

U.S. Pat. No. 5,955,175 describes an improved IR-reflecting material according to U.S. Pat. No. 5,750,242. The improvement consists in an oleophobic coating on the metallic coating. The result is that the membrane is protected from wear and chemical attack.

The disadvantage of the two materials described in '242 and '175 is their behavior under very clear weather conditions such as for example on a clear cold night or on a clear sunny day. Under these conditions, solar reflection and/or cold space reflection occur on the surface of the materials. Consequently, ambient temperatures such as a very warm (sun) or very cold (cold space) temperature is reflected away from the body by the metal layer and causes the surface of the materials to warm up or cool down. This leads to a temperature difference between the environment and the person to be camouflaged. Thus, the surface of the person to be camouflaged shows a warmer or colder temperature than the environment, which in turn makes it possible to detect the person using thermal images.

The present invention has for its object to provide an improved IR-reflecting material which combines high performance with regard to thermal camouflage with a simultaneous reduction in solar and/or cold space reflection.

The present invention further has for its object to provide an improved IR-reflecting material which can be made into a typical article of clothing or used to cover objects and which can be used for thermal image masking or suppression in the mid and far infrared region, especially on a clear sunny day or on a clear night, without compromising the effectiveness of visual and near IR camouflage or the comfort level, effectiveness and mobility of a person.

The present invention further has for its object to provide an IR-reflecting material combining high water vapor permeability with imperviousness to liquid water. The present invention further has for its object to provide an improved IR-reflecting material which possesses a low volume and weight and is flexible, foldable and easily packageable.

This object is achieved by the present invention's material which comprises a water-vapor-permeable metallized ply and an air-permeable drapable convective ply having a three-dimensionally transmissive structure, the convective ply being disposed on one or more sides of the metallized ply. The metallized ply suppresses the thermal imaging of the objects underneath or behind the metallized membrane by reflecting the heat emitted by the body back from the metal layer in the direction of the body. At the same time, the metal layer reflects the temperature of the environment away from the body.

In one embodiment, the metallized ply comprises a metallized textile.

In another embodiment, the metallized ply comprises a water-vapor-permeable metallized membrane, the membrane preferably being watertight. Membranes have the advantage of being thin, light, flexible and drapable materials. This makes them particularly useful for clothing. The water vapor permeability and the concurrent watertightness of the membrane offer very good wear comfort to the person wearing these materials.

Particular preference is given to a water-vapor-permeable microporous metallized membrane having a top surface, a bottom surface and in-between pores, a metal forming a discontinuous layer on at least one of the surfaces and on the membrane's near-surface adjacent pore walls which lie open toward the surface. Thus, the pores remain open for water vapor transportation. In a preferred embodiment, the metal layer is disposed just atop the membrane's top surface and exposed sub-surface portions. Preferably, the membrane is bonded to a textile carrier material.

The use of microporous metallized membranes has plural advantages: 1st. As a result of the fact that the metal in the three-dimensional structure of the microporous membrane appears to be continuous when viewed from above the membrane surface, IR reflection for adequate thermal image camouflage is achieved. 2nd. The discontinuous metallization preserves the porosity of the microporous material. This makes it possible for large amounts of water vapor to pass through the membrane, leading to a reduction in the heat stress on the wearer. The reflected heat is removed from the body through the natural process of sweating.

In one embodiment, at least the metallized surface of the microporous membrane is coated with an oleophobic material. The pores remain open for water vapor transportation. In a further embodiment, the oleophobic layer covers the membrane's top and bottom surfaces and the walls forming the pores of the membrane. The oleophobic treatment protects the metal layer from oxidation, wear and chemical attack.

The convective ply is air permeable, drapable and has a three-dimensionally transmissive structure. Preferably, the convective ply is disposed atop the top surface of the metallized ply. When a garment is produced from the material of the present invention, top surface refers to the outer side, i.e., that surface of the metallized ply that faces the environment.

In a further embodiment, a convective ply is applied both atop the top and the bottom surface of the metallized ply. This measure makes it possible to set a regulated temperature on both surfaces of the metallized ply, and this is advantageous for the IR reflection of the material according to the present invention as well as for the wearer's comfort.

The convective ply has a top surface which corresponds to that surface of the convective ply that is opposite the metallized ply. In a garment, the top surface of the convective ply is the outer surface of the convective ply. In one embodiment, a very air-permeable sheetlike structure is disposed atop the top surface of the convective ply. In another embodiment, the air-permeable sheetlike structure is a constituent part of the convective ply and itself forms the top surface of the convective ply. This sheetlike structure protects the convective ply against mechanical damage, abrasion and serves to supply and remove air. Preferably, the sheetlike structure is transparent to IR waves. In one embodiment, the sheetlike structure is transparent to IR waves and also has camouflage colors which are in the visible part of the spectrum. The IR absorptivity of the material of the air-permeable sheetlike structure and also the color pigments can be used to set the emissivity of the overall system.

The three-dimensional structure has the effect that air flows through the convective ply in the x, y and z directions and consequently absorbs, and removes, heat from the surface of the metallized ply and the outer surface of the transmissive structure consequently is faster to acquire the ambient temperature. Hence the convective ply is a means for temperature control and for convective heat exchange on one or more of the surfaces of the metallized ply. The consequence is that, in the case of a garment comprising the material of the present invention, the temperature especially on the top surface of the convective ply is approximately equal to the ambient temperature.

The convective ply is not less than 2 mm and preferably between 2 to 20 mm in thickness for adequate convective heat exchange. The thickness is preferably 10 mm. In one embodiment, the convective ply is formed by a three-dimensional pimpled formed-loop knit. As a consequence, the air is guided by the arrangement of the tufts to flow uniformly over the surface of the metallized ply or between the metallized ply and the sheetlike structure and absorb heat. Instead of a pimpled formed-loop knit, it is possible to use spacer structures, foams, honeycomblike, riblike, beflocked or netlike three-dimensional structures. What is important is that all these structures have adequate air permeability. The air permeability of the convective ply is not less than 100 l/m²s at a pressure of 10 Pa in the z direction and not less than 50 l/m²s at a pressure of 10 Pa in the lateral direction, i.e., x and y direction. The three-dimensional structure can have any conceivable shape provided air can flow through it in any direction. Only this ensures that air will flow over the entire surface of the metallized ply and a constant exchange with the ambient air can take place. This results in the outer, surface temperature of the convective ply coming into line with the ambient temperature, leaving only small temperature differences. Thermal camouflage is improved even on a clear night or on a sunny day.

It is a further advantage that the convective ply is drapable and hence useful for garments. Preferably, the convective ply is fabricated from textile flexible materials.

More particularly, the present invention provides a garment composed of an infrared-reflecting material, said infrared-reflecting material comprising at least one metallized water-vapor-permeable ply and having at least one ply that is air permeable, drapable and convective and has a three-dimensionally transmissive structure, wherein the convective ply is disposed on one or more of the surfaces of the metallized ply.

DEFINITIONS/TEST DESCRIPTIONS

"Drapable" summarizes the properties of flexible materials which comprise textile hand, mobility, conformability and bendability and thus can be processed into garments and covering shells.

"Watertight" is to be understood as meaning that a material is capable of withstanding a water ingress pressure of not less than 0.13 bar. Preferably, the metallized ply is capable of withstanding a water ingress pressure of above 1 bar. The water pressure is measured by placing distilled water at 20±2° C. on a 100 cm² sample of material under an increasing pressure. The rise in the water pressure is 60±3 cm H₂O/min. The water pressure then is that pressure at which water appears on the other side of the sample. The exact method of carrying out this test is described in the 1981 ISO standard No. 811.

"Oleophobic" is to be understood as meaning that a material has an oil repellency of 1 or more. The oil value is determined according to AATCC test method 118-1983. The higher the oil value, the better the oil repellency. The oil value of the material should be 1 or more, preferably 2 or more and most preferably 4 or more.

"Microporous" refers to a material which has very small, microscopic pores through the internal structure of the material and the pores form an interconnected continuous communication or path from one surface of the material to the other. Depending on the dimensions of the pores, the material is thus permeable to air and water vapor, but water cannot pass through the pores. Pore size can be measured using a Coulter Porometer™, manufactured at Coulter Electronics, Inc., Hialeah, Fla.

"Water vapor permeable" defines a material which has a water vapor transmission resistance Ret of below 150 $(m^2 \times Pa)/W$. The metallized ply preferably has an Ret of below 20 $(m^2 \times Pa)/W$. The water vapor transmission rate is measured by the Hohenstein MDM dry method, which is described in standard test prescription No. BPI 1.4 (1987) of the Hohenstein Institute for Clothing Physiology.

"Air permeable" refers to a material which has an air permeability of not less than 50 $l/m^2 s$ at an air pressure of 10 Pa when measured with an air permeability tester from Textest Instruments (FX 3300), Zurich. Air permeability is determined on the lines of ISO 9237 (1995).

"Metallized" refers to a material which includes metallic constituents and thus enables IR screening to take place. Any metallization can take place on either or both sides of the material and also partially or fully within the structure of the material.

"Convective ply" refers to a material which makes possible a convective airflow for heat exchange.

"Infrared" radiation forms part of the electromagnetic spectrum and identifies the invisible radiation of heat.

The invention will now be more particularly described with reference to drawings, where:

FIG. 1 shows a schematic depiction of the inventive material

FIG. 2 shows a cross section through a microporous membrane having a discontinuous metallic layer FIG. 3 shows a cross section through a metallized membrane which has been laminated atop a carrier material.

FIG. 4 shows a cross section through a metallized membrane to which an oleophobic layer has been applied.

FIG. 9a shows a cross section through an illustrative embodiment of the inventive material.

FIG. 9b shows a cross section through a further illustrative embodiment of the inventive material.

Figure 11:
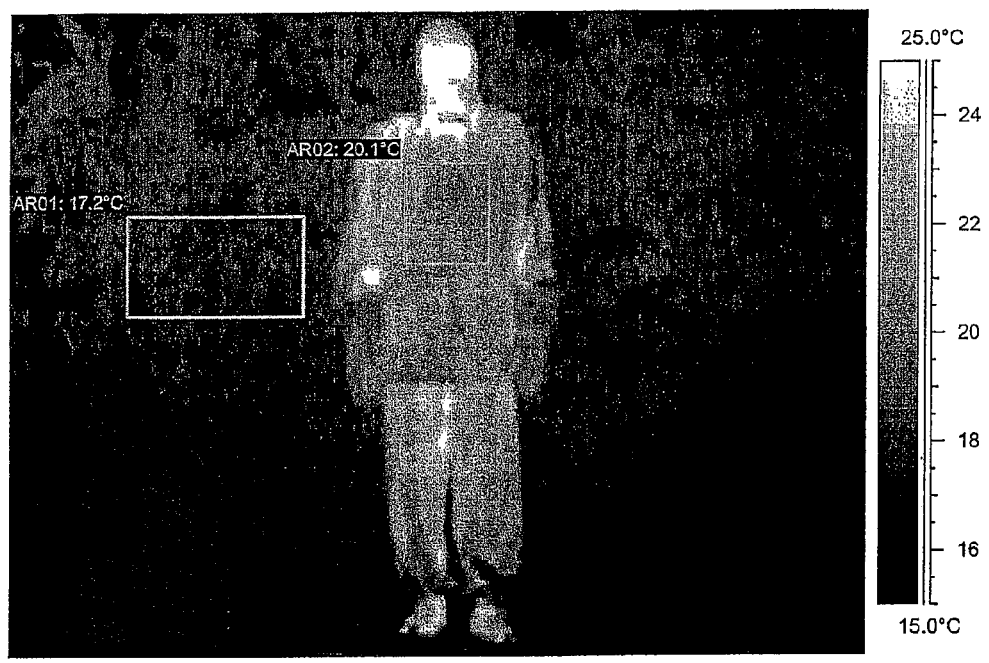
Figure 12:
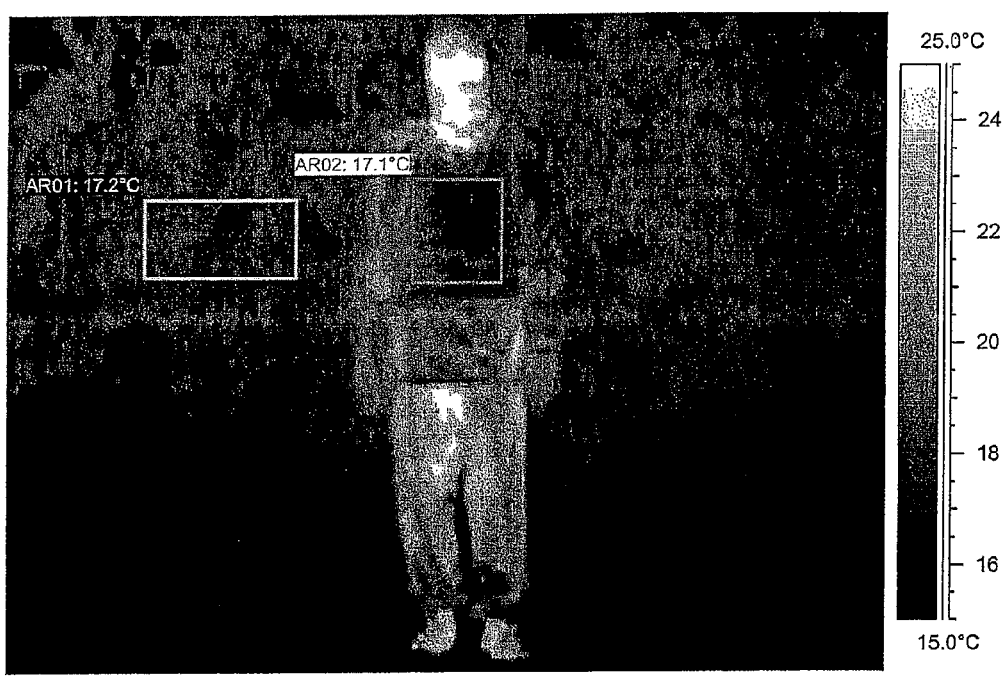
Figure 13:
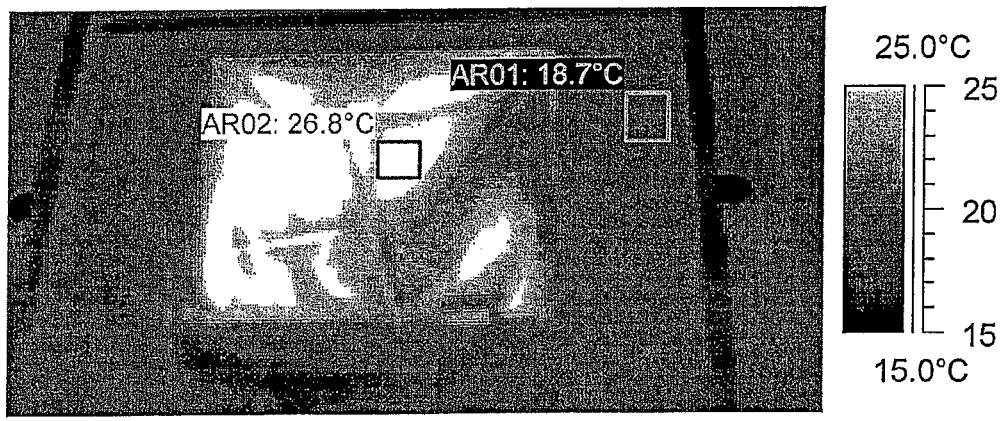
Figure 14:
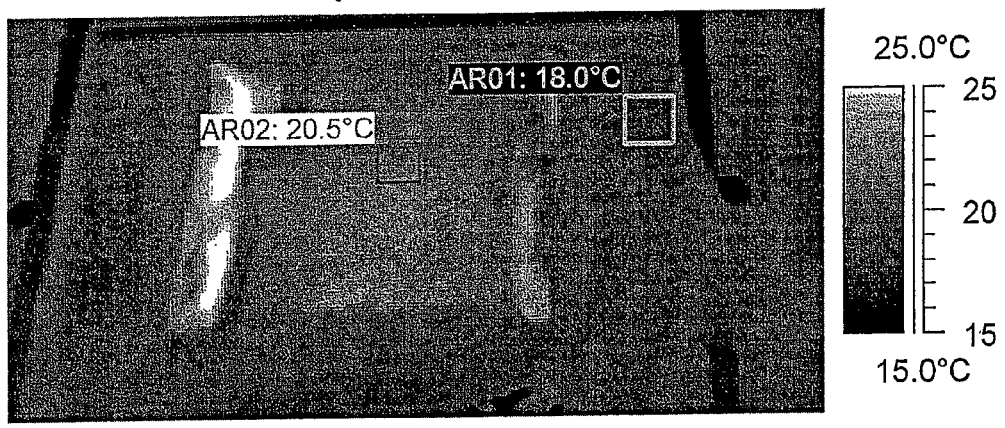

FIG. 11 shows the thermal image of a convective ply FIG. 12 shows the thermal image of the inventive material FIG. 13 shows the thermal image of a further metallized membrane FIG. 14 shows a further thermal image of the inventive material FIG. 1 shows a schematic depiction of the invention. The inventive infrared-reflecting material (10) comprises a water-vapor-permeable metallized ply (20) having a top surface (22) and a bottom surface (24). Atop at least one of the surfaces (22, 24) of the metallized ply (20) is a drapable convective ply (30). The convective ply (30) has an air-permeable three-dimensionally transmissive structure. Atop the top surface (32) of the convective ply (30), opposite to the metallized ply (20), is an air-permeable sheetlike structure (40). In another embodiment, the air-permeable sheetlike structure (40) is a constituent part of the convective ply (30) and itself forms the ply's top surface (32). The three-dimensionally transmissive structure permits heat convection within the convective ply (30) and on the surface (22, 24) of the metallized ply (20) in order that the outer surface of the convective ply (30), i.e., the sheetlike structure (40), may be brought into line with the ambient temperature. Heat convection in this connection means achieving cooling or heating of the temperatures reflected by the metallized ply (20) through air convection.

The metallized water-vapor-permeable ply (20) is a metallized textile layer in one embodiment. The metal layer of such a metallized textile layer is present as a metallic film or in the form of metallic particles, fibers or pigments. The metal layer is applied either to one or both surfaces of the textile layer and/or is situated within the textile layer. The metallized textile layer comprises woven, loop-drawingly knitted or loop-formingly knitted textiles composed of polypropylene, polytetrafluoroethylene, polyethylene, polyamide, polyester, polyurethane, cotton, wool and combination thereof.

The metallized ply (20) is preferably a metallized membrane or film. The metallized membrane can be present as a nonporous (monolithic) membrane or as a microporous membrane. Examples of nonporous membranes are polyurethane, copolyethers, copolyesters or silicones. Membranes are thin, light, flexible and drapable and hence particularly useful for clothing. In addition they can be water vapor permeable and water-tight and hence appreciably improve the comfort characteristics of garments.

FIG. 2 shows a cross section through a preferred microporous membrane (50) having a metal layer (55). The microporous membrane (50) has a top surface (51), a bottom surface (53) and discontinuous polymeric sections which define pores (52) in between.

Preferred microporous membranes (50) comprise fluoropolymers such as for example polytetrafluoroethylene; polyolefins such as polyethylene or polypropylene; polyamides, polyesters; polysulfones, polyethersulfones and combinations thereof; polycarbonate; polyurethanes. Preference is given to a membrane composed of expanded polytetrafluoroethylene (ePTFE). The ePTFE membrane is present in a thickness between 5-500 µm and preferably between 50-300 µm.

This material is notable for a multiplicity of open, interconnected voids, a large void volume and great strength. Expanded PTFE is soft, flexible, has stable chemical properties, a high permeability to gases as well as vapors, and a surface which is very effective in repelling contaminants.

The porosity and the pore size is chosen such that gas diffusion is not hindered. The average pore size can be 0.02-3 µm, preferably 0.1-0.5 µm. The porosity is 30-90%, preferably 50-80%. At the same time, the material is watertight. A process for producing such porous membranes from expanded PTFE is disclosed for example in U.S. Pat. No. 3,953,566 and U.S. Pat. No. 4,187,390.

In one embodiment, the ePTFE membrane comprises a polymeric layer which is water vapor permeable, continuous and hydrophilic. Without restriction thereto, suitable continuous water-vapor-permeable polymers are those from the family of the polyurethanes, from the family of the silicones, from the family of the copolyetheresters or from the family of the copolyetherester amides. Suitable copolyetheresters of hydrophilic compositions are taught in U.S. Pat. No. 4,493, 870 (Vrouenraets) and U.S. Pat. No. 4,725,481 (Ostapachenko). Suitable polyurethanes are described in U.S. Pat. No. 4,194,041 (Gore). Suitable hydrophilic compositions are described in U.S. Pat. No. 4,230,838 (Foy et al.). A preferred class of continuous water-vapor-permeable polymers are polyurethanes, particularly those which contain oxyethylene units as described in U.S. Pat. No. 4,532,316 (Henn).

The metal layer (55) is preferably applied atop the top surface of the membrane (51); the metal coats the top surface of the "open" pore walls. "Open" pore walls are those portions of the pore walls that either comprise the top surface or exposed sub-surface portions of the membrane. Looking vertically down on the top surface (22), the metal layer (55) forms continuous line-of-sight coverage. From the side, it is seen that the metal layer (55) is discontinuous, leaving the pores (52) open for passage of water vapor, while covering the top surface (22) and exposed sub-surface portions thereof.

The metallization is typically on one side only, but can be on both sides or throughout the entire structure of the membrane. The metallization can be applied to the membrane using a number of coating techniques including physical vapor deposition by, for example, sputter coating, vacuum vaporization, chemical vapor deposition, electroless plating or by other known coating techniques. The emissivity of the metal coating can range from 0.04 to 1, depending on the desired thermal performance. The emissivity is determined using an emissiometer from Devices and Services, model AE. When a high degree of reflectance is desired, a low emissivity coating of appropriate thickness is required. On the other hand, when a large degree of absorbance is desired, a high emissivity coating of appropriate thinness will be required.

The metal used in the metallized microporous films and membranes can be any metal that can be vapor deposited or sputtered onto the film or membrane and produce the desired reflective effect, such as aluminum, gold, silver, copper, zinc, cobalt, nickel, platinum, palladium, tin, titanium or the like, or any alloys or combinations of these metals. Preferably, the metallized ply is expanded polytetrafluoroethylene (ePTFE) which has been aluminized. Such metallized microporous membranes and their production are described for example in U.S. Pat. No. 5,750,242.

The metallized membranes have a water vapor permeability of below 150 $(m^2 \times Pa)/w$. This ensures that garments or coverings comprising metallized membranes can give off moisture in the form of water vapor to the environment.

In FIG. 3 the metallized microporous membrane (50) has been provided with a textile carrier material (59) which endows the membrane with additional protection and strength. The carrier material (59) can be laminated onto the metallized surface or the membrane using a water-vapor-permeable continuous or discontinuous layer of adhesive. It is also possible to apply the carrier material atop the nonmetallized surface. Advantageously, the carrier material (59) is a textile sheetlike structure composed of woven, loop-formingly knitted or loop-drawingly knitted, natural or synthetic textile materials. Alternatively, a further sheetlike structure can be disposed atop the other surface of the membrane. The adhesive and the carrier material (59) have to have a certain IR transparency in order that the advantageous properties of the inventive material are not reduced.

In a further embodiment, the metallized ply has been oleophobicized in order that the metal layer (55) may be protected against oxidation. An oleophobicized metallized microporous membrane (50) is depicted in FIG. 4. There, a metallized microporous membrane (50) has been provided with an oleophobic layer (57). Any oleophobicization takes place after conclusion of the metallization process and is effected such that the porosity of the membrane is not distinctly reduced. Usually, an oleophobicizing agent is applied in liquid form to the material to be oleophobicized, as for example by dipping, drenching, spraying, coating, brushing, rolling. Particular preference for the present invention is given to an oleophobicized metallized ePTFE membrane in accordance with the disclosure of U.S. Pat. No. 5,955,175. The oleophobicized microporous membrane (50) may likewise be laminated with at least one textile carrier layer (59).

The convective ply (30) is a layer which, through air convection, removes heat or cold from the surface of the metallized ply (20). To this end, the convective ply (30) has an air-permeable, three-dimensionally transmissive structure. Three-dimensionally transmissive structure is to be understood as meaning for the purposes of the present invention that there is low drag in the x, y and z direction and also that a gap which is in constant air exchange with an environment is defined in the z direction. The result is that air enters the convective ply (30), flows over the surface of the metallized ply and absorbs heat or cold, depending on the prevailing conditions, and transports it away to the environment.

In addition, the convective ply (30) is drapable. Drapability is very important for the present invention in order that the material of the present invention can be processed into flexible garments (12) or coverings. To this end, the convective ply (30) is produced from flexible, preferably soft, conformable materials such as textile fibers or yarns which permit a certain deformability on the part of the convective ply (30). They include materials such as polyolefins, examples being polypropylenes; polyesters, polyamides, aramids, polyacrylamides or natural fibrous materials such as wool, silk, cotton, flax or blends thereof. In addition, soft, conformable structures can be achieved via the processing of these materials.

The convective ply (30) can have any possible form or construction as long as three-dimensional transmissivity and adequate air permeability are ensured. Preferably, the convective ply (30) forms a defined gap above at least one of the surfaces of the metallized membrane (50) in the material of the present invention. To this end, the three-dimensional structure comprises spacers (34) which are preferably disposed, substantially vertically within the convective ply (30) in relation to at least one of the surfaces of the metallized ply (20). The spacers (34) are preferably elastically compressible and can give in the event of a deformation on the part of the material of the present invention, only to return to their original state after the deforming load has been removed. Preferably, the spacers (34) are transmissive as well. Thus, the convective ply splits incoming air above the surface of the metallized ply (20) uniformly into x, y and z direction. The air absorbs excess heat or cold from the surface of the metallized ply (20) and transports it away from the surface. This causes the surface temperature of the convective ply to come into line with the ambient temperature. The convective ply (30) has an air permeability of not less than 100 $l/m^2 s$ at a pressure of 10 Pa in the z direction and of not less than 50 $l/m^2 s$ at a pressure of 10 Pa in the lateral, i.e., x and y direction. Preferably, the air permeability is in the range from 500 to 2000 $l/m^2 s$.

The convective ply (30) can be formed by three-dimensional textiles such as pimpled nonwovens, pimpled drawn-loop knits, pimpled wovens, pimpled formed-loop knits (36), formed-loop spacer knits (60) or deflocked materials (39). Similarly, reticulated foams of polyester or of polyurethane and also honeycomb-, rib- or netlike three-dimensional structures can be used. In general, the convective ply (30) can be selected from the group of materials comprising polypropylene, polyester, polyurethane, polyethylene, polyamides and combination thereof.

To achieve good convection, the convective ply (30) has to be not less than 2 mm and preferably between 2 to 20 mm in thickness. It has been determined that a thickness of 10 mm provides very good thermal shielding.

Figure 5:
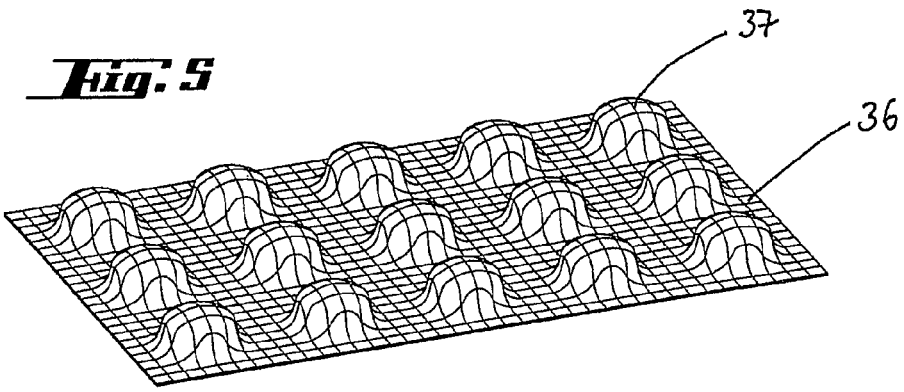
FIG. 5 shows a schematic depiction of a pimpled formed-loop knit as a convective ply which is air permeable and drapable.
Figure 6:
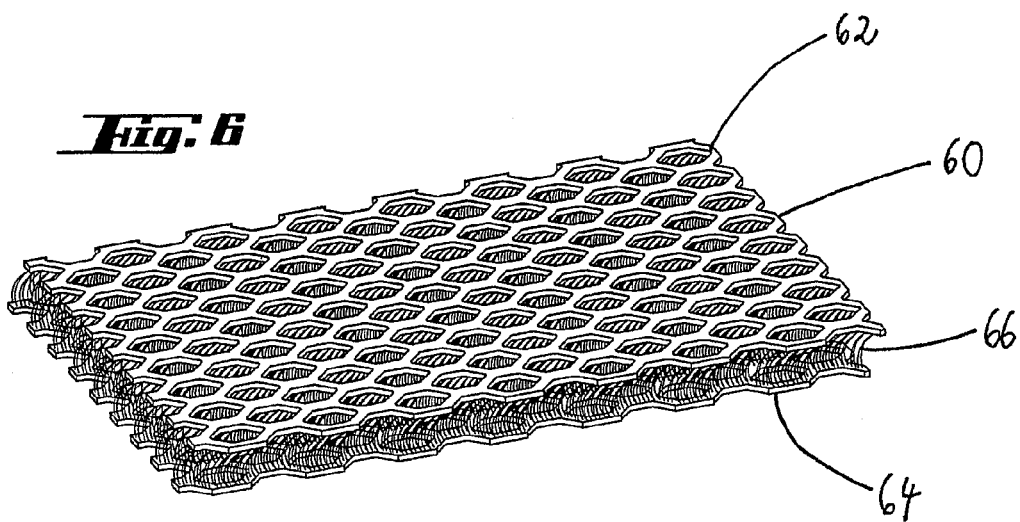
FIG. 6 shows a schematic depiction of a spacer structure as a convective ply which is air permeable and drapable.
Figure 7:
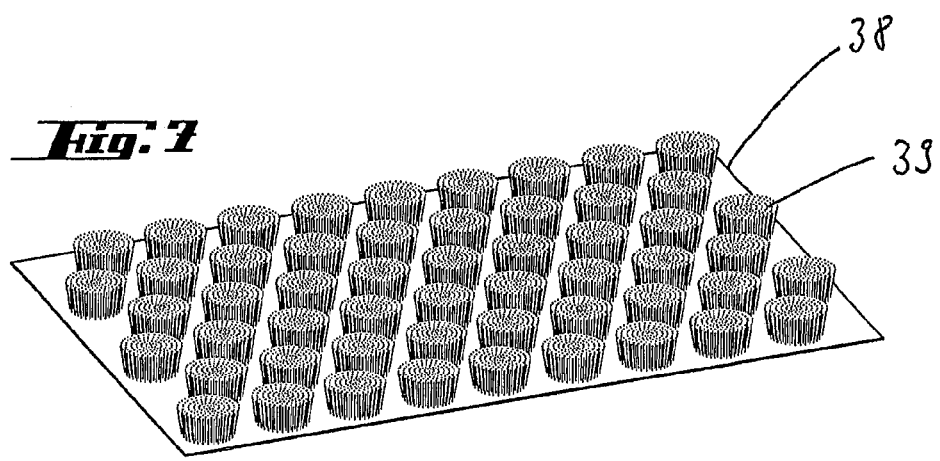
FIG. 7 shows a schematic depiction of a deflocked metallized ply as a convective ply which is air permeable and drapable.

Advantageous embodiments are schematically depicted in FIGS. 5 to 7.

Referring to FIG. 1, an air-permeable sheetlike structure (40) is disposed atop the top surface (32) of the convective ply (20), opposite the surface of the metallized ply (20). The air-permeable sheetlike structure (40) can also be a constituent part of the convective ply (30) itself and form the convective ply's top surface (32).

The sheetlike structure (40) protects the convective ply (30) against external influences such as abrasion and mechanical damage, regulates the air exchange between the environment and the convective ply (30) and equalizes the temperature between the environment and the convective ply (30). Especially in a garment (12), this sheetlike structure (40) constitutes the outer surface of the garment (14). The above-described convection within the convective ply (30) causes the outer surface of the garment (14) to assume a temperature which is substantially equal to the ambient temperature. Thus, the garment (12) is virtually invisible to a thermal imager. Preferably, the sheetlike structure (40) is porous with an average pore size in the range from 0.1 to 10 µm. Preferred materials are wovens, formed-loop knits or drawn-loop knits of polypropylene or of polyethylene. Polypropylene and polyethylene are particularly preferred since these materials are transparent to IR waves. Further materials can comprise silk, polyamide, polyester, polyurethane and combination thereof. The sheetlike structure is preferably a textile material, specifically a woven, loop-formingly knitted, loop-drawingly knitted, mesh or net material constructed such that it has a relatively high permeability to air. The air permeability of the sheetlike structure (40) is not less than 50 l/m²s at an air pressure of 10 Pa. Other textile materials such as synthetic materials (polyamides, polyesters, polyolefins, acrylics) or natural materials (cotton, wool, silk or combinations thereof) can be used. One embodiment of the invention utilizes a textile sheetlike structure having a loop-drawingly knitted mesh structure and obtainable under the trade name Cordura®AFT from Rökona. In addition, the sheetlike structure (40) can be provided with a camouflage print for camouflaging purposes.

In one embodiment, the material of the present invention is a composite formed from the metallized ply (20) and at least one convective ply (30), the two plies being adhered or stitched together at selected locations. In the case of stitching, care must be taken to ensure that the seams are sealed off watertight. In another embodiment, the metallized ply (20) and the at least one convective ply (30) form a laminate. To form a laminate, the two plies are adhered together with a water-vapor-permeable continuous or discontinuous adhesive, a polyurethane adhesive for example, under heat and pressure. In addition, the air-permeable sheetlike structure (40) can be secured to the at least one convective ply (30), for example through uniform or partial laminating, by stitching or by adhering. Here too care must be taken to ensure that the adhesive has to have a certain IR transparency.

FIG. 5 shows an air-permeable drapable convective ply (30) which is a pimpled formed-loop knit (36) preferably composed of a three-dimensionally deformed polypropylene formed-loop knit. Instead of polypropylene it is possible to use a polyester, polyethylene or polyamide formed-loop knit or mixtures thereof. Preference is given to polypropylene and polyethylene by virtue of their IR wave transparency. The pimples are formed from a sheetlike ground structure of the same material in a row, offset relative to each other or else in any other desired structure. The flexible ground structure is preferably an open-pore formed-loop knit, nonwoven, drawn-loop knit, lattice or woven. The air permeability of this open-pore pimpled formed-loop knit (36) is preferably greater than 500 l/m²s at an air pressure of 10 Pa. Instead of pimples it is possible to use fillets or similar geometric shapes that form a three-dimensional structure. Preferably, the pimples are perpendicular to the ground structure. The pimples accordingly form not only spacers (34) for a convective ply (30) having a defined gap but also flow passages for the air, so that it can divide uniformly in the x, y and z directions, not only around the pimples but, owing to their open-poredness, through the pimples. The pimpled formed-loop knit (36) is flexible and elastically compressible and hence suitable for processing in garments (12). Such three-dimensional pimpled formed-loop knits (36) are available for example from Textec Construct GmbH of Detmold in Germany. The pimples of a pimpled formed-loop knit from Textec have a pimple height between 2 to 19 mm. The production of such pimpled formed-loop knits (36) is disclosed for example in the DE 200 12 275 utility model.

FIG. 6 shows a further illustrative embodiment of an air-permeable drapable convective ply (30). The convective ply (30) is in this instance formed by a spacer structure (60). The spacer structure (60) is formed by two mutually parallel air-permeable sheetlike structures (62, 64) composed of polypropylene, polyamides, polyesters for example, the sheetlike structures (62, 64) being air-permeably interconnected and also spaced apart by fibers (66). Some or all of the fibers (66) are disposed as spacers (34) perpendicular between the sheetlike structures (62, 64). The fibers (66) are composed of a flexible, formable material such as polyester or polypropylene for example. The air flows through the sheetlike structures (62, 64) and through the fibers (66). The sheetlike structures (62, 64) are open-pore woven, loop-drawingly knitted or loop-formingly knitted textile materials. Such a spacer structure (60) is obtainable for example from Müller Textil GmbH of Wiehl-Drabenderhöhe in Germany.

FIG. 7 shows a further illustrative embodiment of an air-permeable drapable convective ply (30). In this illustrative embodiment, the metallized ply (20) is partially deflocked with fibers (66) (composed for example of polypropylene, polyester, polyamide or blends thereof). This creates, directly atop the surface of the metallized ply (20) a three-dimensional structure when the fibers (66) are perpendicularly secured atop the metallized ply (20) as spacers (34) for the metallized ply (20). The production of deflocked articles (38) is disclosed for example in EP 889 697 B1, where flock particle material (39) such as flat fibers is secured atop expanded PTFE.

Figure 8:
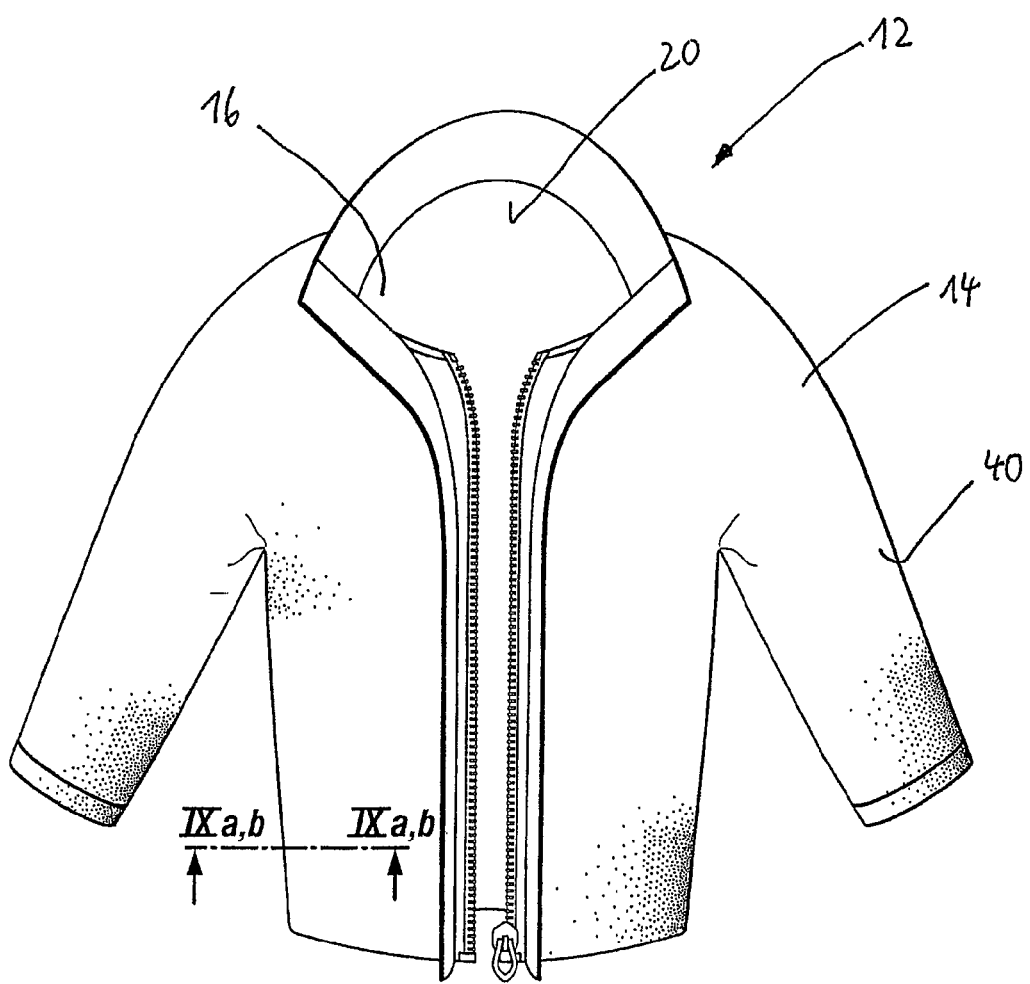
FIG. 8 shows a garment comprising the inventive material

FIG. 8 shows a garment (12), comprising the inventive material (10), in the form of a jacket. Garments (12) for the purposes of the present invention include jackets, coats, vests, pants, gloves, caps, shoes and the like. Preferably, the garments (12) serve as watertight, and water-vapor-permeable camouflage clothing. The garment (12) has an outer surface (14) and an inner surface (16) and is constructed from the inventive material (10). The metallic ply (20) forms the inner surface (16) and the convective ply (30), preferably combined with an air-permeable sheetlike structure (40), forms the outer surface (14). The metallic ply (20) can additionally be equipped with further layers such as insulating layers and/or lining layers.

FIGS. 9a and 9b show two embodiments of the garment (12), each in cross section along the dashed line IXa, b in FIG. 8. FIG. 9a shows the metallized ply (20) as inner surface (16) and the air-permeable sheetlike structure (40) as outer surface (14). The metallized ply (20) is preferably a metallized ePTFE membrane. The air-permeable sheetlike structure (40) is preferably an open-pore textile woven material. A convective ply (30) in the form of a pimpled formed-loop knit (36) is disposed in between. The pimpled formed-loop knit (36) is disposed such that the pimples (37) are directed toward the sheetlike structure (40). FIG. 9b shows the same construction as FIG. 9a except that the pimpled formed-loop knit (36) is disposed such that the pimples (37) are directed toward the metallized ply (20).

EXAMPLES

To illustrate the invention, a ThermaCAM™PM 575 (thermal-imaging) infrared camera from Flier Systems GmbH was used to take pictures of various samples at a wavelength of 8-12 μm. The infrared camera measures the infrared radiation emitted by an object and converts it into a visible image. Since the radiation is a function of the surface temperature of the object, the camera is able to accurately compute and display this temperature. As well as sample temperatures, ambient temperatures were determined in each test. A computer program (AGEMA®Report) was used to process the images so that the average temperatures of a sample and its ambiance can be computed. The smaller the difference between ambient temperature and sample temperature, the better the thermal camouflage.

Example 1

Figure 10:
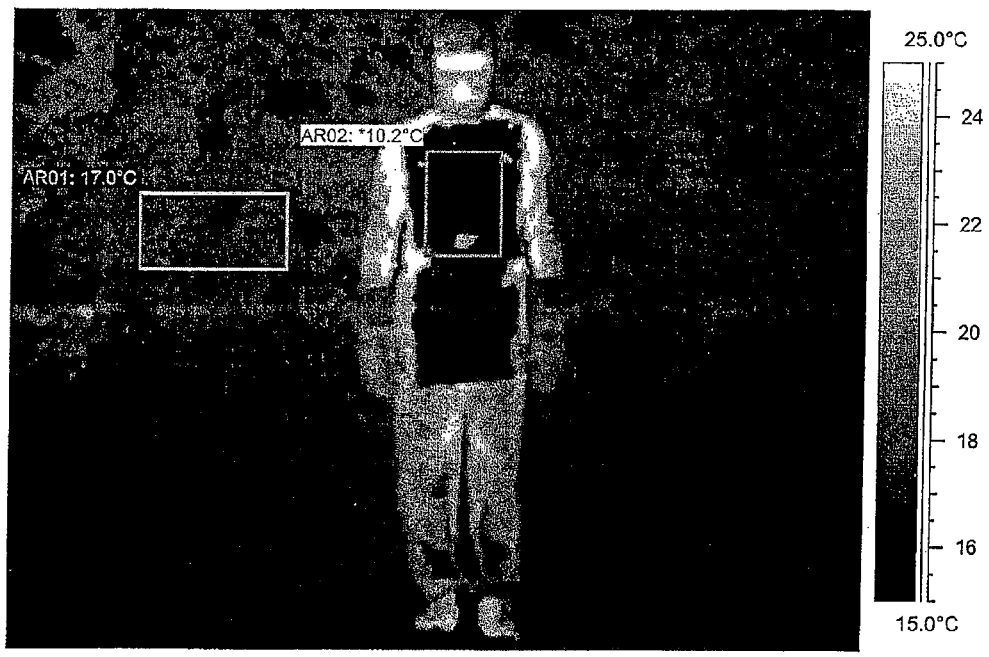
FIG. 10 shows the thermal image of a metallized membrane

The experimental results are depicted in the thermal images of FIGS. 10 to 12. The measurement took place on a bright day with hardly any wind in an infrared range of 8-12 μm. The particular sample was integrated in the chest region of a camouflage suit worn by a test person. The sample temperature Tm was recorded on the chest surface of the test person.

The metallized membrane is a membrane of microporous ePTFE having a thickness of 25 μm and a nominal pore size of 0.2 μm. Such a membrane is obtainable from W.L. Gore & Associates. The ePTFE membrane was metallized by vapor-depositing aluminum by evaporations and condensation. Specifically, aluminum wire was heated in an oxide crucible at a high vacuum (0.0002666 Pa) at about 1220° C. The aluminum vaporized. The ePTFE membrane was passed over the crucible. Vapor from the crucible rose to form a discontinuous layer on the adjacent side of the membrane. The coated membrane was then wound on a roll.

The 1st sample was made by placing a drawn-loop polypropylene knit having an air permeability of 65 l/m²s at an air pressure of 10 Pa on the metallized side of the membrane.

The 2nd sample comprises a spacer formed-loop knit, having a height of 10 mm and being composed of polyester, from Müller Textil GmbH, Germany. The spacer formed-loop knit has an air permeability of 870 l/m²s. A polyester drawn-loop knit having an air permeability of 550 l/m²s at an air pressure of 10 Pa has been disposed on the spacer formed-loop knit. The 3rd sample comprises a metallized membrane corresponding to the 1st sample, supporting a spacer formed-loop knit according to the 2nd sample which in turn supports a polyester drawn-loop knit having an air permeability of 550 l/m²s at an air pressure of 10 Pa. All three samples face the infrared camera with the drawn-loop knit ply nearest the camera.

TABLE 1

Comparison of thermal shielding of various shielding samples at a wavelength of 8-12 μm.

| Layered construction of sample | Ambient temperature Tu in ° C. | Sample temperature Tm in ° C. | Temperature difference ΔT in K |
|---|---|---|---|
| 1st Metallized membrane (aluminum) with drawn-loop knit, FIG. 10 | 17.0 | 10.2 | 6.8 |
| 2nd Convective ply with drawn-loop knit, FIG. 11 | 17.2 | 20.1 | 2.9 |
| 3rd Metallized membrane (Al) with convective ply and with drawn-loop knit, FIG. 12 | 17.2 | 17.1 | 0.1 |

With the 1st sample (FIG. 10), the surface of the sample cools down very considerably through reflection of the sky and there is a discernible temperature difference to ambient temperature. With the 2nd sample (FIG. 11), thermal camouflage is better than with the 1st sample, but the surface temperature is somewhat too high as a result of body heating and/or insolation. The 3rd sample (FIG. 12) shows the inventive construction and a temperature that is almost identical to ambient temperature.

Example 2

The experimental results are depicted in the thermal images of FIGS. 13 to 14. This test took place at a wavelength of 8-12 μm.

The samples were situated on a hot plate at a temperature of 32° C. to simulate human skin temperature. The environment was cooled to a temperature of ~18° C. to simulate a cold sky. There was a side wind at 1 m/s. The 4th sample comprises a microporous membrane as for the 1st sample together with an additional hydrophilic continuous coating of polyurethane. Such a membrane is available from W.L. Gore & Associates and was metallized by the method used to metallize the 1st sample. A polyethylene drawn-loop knit having an air permeability of 800 l/m²s at an air pressure of 10 Pa, obtainable from Rökona, is disposed on the metallized layer. The 5th sample comprises the same membrane as in the 4th sample, supporting a polyester spacer formed-loop knit having a height of 10 mm and an air permeability of 870 l/m²s, obtainable from Müller Textil GmbH of Germany, and in turn supporting a polyethylene drawn-loop knit having an air permeability of 800 l/m²s at an air pressure of 10 Pa. Both samples were infrared recorded with the drawn-loop knit ply nearest the camera.

TABLE 3

Comparison of thermal camouflage of two shielding samples at a wavelength of 8-12 µm.

| Layered construction of sample | Ambient temperature Tu in °C. | Sample temperature Tm in °C. | Temperature difference ΔT in K |
|---|---|---|---|
| 4th Metallized membrane (Al) with continuous polyurethane coating and with drawn-loop knit | 17.5 | 26.8 | 9.3 |
| 5th Metallized membrane (Al) with continuous polyurethane coating and with 10 mm convective ply and with drawn-loop knit | 17.1 | 19.8 | 2.7 |

In contrast to Example 1, the 4th sample heats up compared with ambient temperature. As a result, the temperature difference is correspondingly high and there is no adequate thermal camouflage. The 5th sample shows a significantly lower temperature difference. This meant that the surface of this sample has sufficiently equalized to ambient temperature. There is thermal camouflage.

The invention claimed is:

1. A garment having an outer side and an inner side, said garment comprising:
    an infrared-reflecting material comprising a metalized porous fluoropolymer membrane having therein open pore walls, said metalized porous fluoropolymer membrane having a top surface and a bottom surface, and
    an air permeable, drapable and convective ply having a three-dimensionally transmissive structure, said convective ply comprising spacers disposed substantially vertically within said convective ply with respect to at least one of the top surface and the bottom surface of the metalized porous fluoropolymer membrane,
    wherein the convective ply is disposed on the top surface of the metalized porous fluoropolymer membrane, and
    wherein said spacers provide air exchange with the environment such that air flows through said convective ply in x, y, and z directions, said air exchange causing said outer side of said garment to be substantially equal to ambient temperature,
    wherein said metalized porous fluoropolymer membrane has a discontinuous metalized surface.

2. The garment according to claim 1 wherein the convective ply has a top surface with an air-permeable sheet structure disposed thereon, said air-permeable sheet structure being a constituent part of said convective ply and forming the top surface of said convective ply.

3. The garment according to claim 2 wherein the sheet structure has an air permeability of not less than 50 l/m²s at a pressure of 10 Pa.

4. The garment according to claim 1 wherein the convective ply is not less than 2 mm in thickness.

5. The garment according to claim 1 wherein the convective ply has a structure that is ribbed, honeycombed, pimpled, a net, deflocked, or foamed.

6. The garment according to claim 1 wherein the convective ply is a three-dimensional pimpled formed-loop knit.

7. The garment according to claim 1 wherein the convective ply is selected from the group consisting of polypropylene, polyester, polyurethane, polyethylene, polyamide and combinations thereof.

8. The garment according to claim 1 wherein the convective ply has an air permeability in the z direction of not less than 100 l/m²s at a pressure of 10 Pa.

9. The garment according to claim 1 wherein the convective ply has an air permeability in the x and y directions of not less than 50 l/m²s at a pressure of 10 Pa.

10. The garment according to claim 1, wherein said spacers form defined gaps above at least one of said top surface and said bottom surface of said metalized porous fluoropolymer membrane.

11. The garment according to claim 1, wherein said spacers are elastically compressible.

12. A garment having an outer side and an inner side, said garment comprising:
    at least one infrared-reflecting material comprising a metalized water-vapor-permeable expanded polytetrafluoroethylene membrane having a top surface and a bottom surface, and
    at least one air permeable, drapable and convective ply having a three-dimensionally transmissive structure,
    wherein the convective ply is disposed on at least one of said top surface and said bottom surface of said metalized ply, and
    wherein the convective ply is a three-dimensional pimpled formed-loop knit, and
    wherein said metalized expanded polytetrafluoroethylene membrane has a discontinuous metalized surface.

13. The garment of claim 12, wherein the convective ply is formed of a material selected from the group consisting of polypropylene, polyester, polyurethane, polyethylene, polyamide and combinations thereof.

14. The garment of claim 12, wherein the convective ply has a top surface with an air-permeable sheet structure disposed thereon, said air-permeable sheet structure being a constituent part of said convective ply and forming the top surface of said convective ply.

15. The garment of claim 14, wherein the sheet structure has an air permeability of not less than 50 l/m²s at a pressure of 10 Pa.

16. The garment of claim 12, wherein said convective ply has an air permeability in x and y directions of not less than 50 l/m²s at a pressure of 10 Pa.

17. The garment of claim 12, wherein said convective ply has a thickness from 2 mm to 20 mm.

* * * * *

UNITED STATES PATENT AND TRADEMARK OFFICE
CERTIFICATE OF CORRECTION

| | | |
|---|---|---|
| PATENT NO. | : 8,918,919 B2 | Page 1 of 1 |
| APPLICATION NO. | : 10/525588 | |
| DATED | : December 30, 2014 | |
| INVENTOR(S) | : Hermann Scholz | |

It is certified that error appears in the above-identified patent and that said Letters Patent is hereby corrected as shown below:

On the Title Page

Item (73), remove "W. L. Gore & Associates, Inc., Newark, DE (US)"

In the Specification

At column 13, line 1: change "TABLE 3" to --TABLE 2--

Signed and Sealed this
Seventh Day of April, 2015

Michelle K. Lee
*Director of the United States Patent and Trademark Office*